May 21, 1957 J. HABESHAW ET AL 2,793,236
HYDROGENATION OF OXO ALDEHYDE BOTTOMS
Filed July 18, 1952
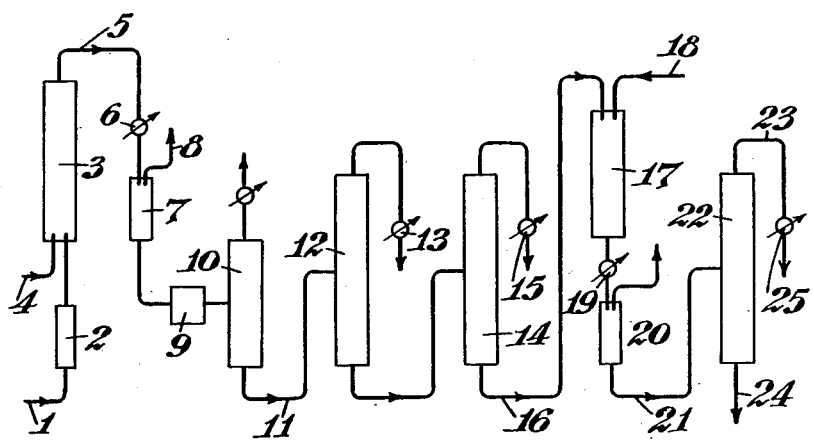
Inventors:
John Habeshaw
Robin William Rae
Morgan, Finnegan & Durham
Their Attorneys

2,793,236

HYDROGENATION OF OXO ALDEHYDE BOTTOMS

John Habeshaw and Robin William Rae, Sunbury-on-Thames, England, assignors to The British Petroleum Company Limited Application July 18, 1952, Serial No. 299,679

Claims priority, application Great Britain July 25, 1951

8 Claims. (Cl. 260—638)

This invention relates to an improved process for the production of oxygenated organic compounds. More particularly the invention relates to an improved process for the production of alcohols by the so-called Oxo process.

It is well-known that by reacting olefins with carbon monoxide, in the presence of other compounds such as hydrogen, water or alcohols, oxygenated organic compounds may be synthesised, the method being known as the Oxo synthesis reaction. Thus by reacting an olefin with water gas at temperatures of about 80° C.–180° C. and at pressures of about 50–300 atmospheres, in the presence of a suitable catalyst, aldehyde having one more carbon atom/molecule than the olefin are obtainable in good yields. From ethylene, a single aldehyde, propionaldehyde is formed as the main product. From higher olefins, mixtures of isomeric aldehydes are formed as the main product.

Catalysts commonly employed hitherto have been solid cobalt-containing materials, a typical catalyst being one containing by weight 100 parts of cobalt, 5 parts of thoria, 9 parts of magnesia and 200 parts of kieselguhr.

It is also well-known that the main aldehydic product of the Oxo-synthesis reaction may be hydrogenated to form alcohols having the same number of carbon atoms/molecule.

It is an object of this invention to provide an improved process for the production of oxygenated organic compounds. It is a further object to provide a process for the production of alcohols, in improved yields, by the so-called Oxo process. Other objects will appear hereinafter.

According to the invention oxygenated organic compounds, obtained in the Oxo synthesis reaction and boiling above the main aldehydic product of the reaction, are subjected to hydrogenation, under conditions for conversion, at least in part, to lower boiling alcohols.

According to a further feature of the present invention, an olefinic hydrocarbon is reacted with carbon monoxide and hydrogen in the presence of a cobalt catalyst under the conditions of the Oxo synthesis reaction, the product treated for the separation of an aldehydic fraction comprising the main aldehydic product, wherein the aldehyde is of one more carbon atom/molecule than the olefin treated and a high boiling fraction, boiling above said aldehydic fraction, the high boiling fraction treated under hydrogenation conditions for the production of alcohols having the same number of carbon atoms/molecule as said main aldehydic product and said alcohols recovered from the product of the hydrogenation treatment.

Preferably the Oxo synthesis products are first subjected to phase separation for removal of a gaseous effluent and the liquid phase so obtained distilled for the separation of a hydrocarbon fraction (except when ethylene is employed) comprising unreacted olefin, an aldehydic fraction and a high boiling fraction.

If desired, the main aldehydic product may be subjected to hydrogenation for conversion to alcohols having the same number of carbon atoms/molecule, these alcohols being recovered together with the alcohols obtained from the hydrogenated high boiling fraction. In general, the hydrogenating conditions required for the conversion of the main aldehydic product to the corresponding alcohols are milder than the conditions which give optimum yields of these alcohols by hydrogenation of the high boiling fraction. The process is however of particular value in obtaining fields of alcohols from Oxo process residues when it is the intention to obtain the main product as aldehydes.

It has been found that good yields of alcohols are obtained from the high boiling Oxo products when the conversion efficiency of the Oxo synthesis stage, for the production of the main aldehydic product is relatively high.

The hydrogenation treatment of the high boiling fraction may be carried out in the presence of conventional hydrogenation catalysts. Suitable catalysts include group VIII metals, such as nickel and cobalt, either alone or as Raney nickel, and Raney cobalt, or as a supported catalyst on materials such as kieselguhr and silica gel. Other catalysts are copper catalysts of the types well known in the art to be effective in the hydrogenation of aldehydes to alcohols. Nickel, cobalt and copper catalysts are particularly suitable.

In general, hydrogenation of the high boiling fraction on a Raney nickel catalyst is effected at temperatures in the range 150–200° C. and pressures in the range 500 to 5000 lbs./sq. in. although, if desired, higher or lower temperatures and pressures may be employed.

Preferably the hydrogenation is effected by means of a nickel-on-kieselguhr catalyst in a fixed bed with temperatures in the range 150–200° C. (preferably 180–200° C.) hydrogen pressures in the range 50–200 atmospheres and liquid feed rates of 0.5–2.0 volumes/volume of catalyst/hour.

While the process of this invention may be applied to the Oxo synthesis products obtained from any olefin hydrocarbons, the products obtained from mono-olefins of 2–4 carbon atoms/molecule constitute a preferred feedstock.

The process has been found particularly satisfactory in augmenting the yields of normal- and iso-butanols obtained by the conversion of propylene in the Oxo process.

According to preferred operation in the treatment of the Oxo synthesis product obtained from propylene, the hydrogenated high boiling fraction is fractionated to recover a fraction comprising normal- and iso-butanol overhead, and high boiling compounds as residue. The mixed butanols are then fractionated to yield a crude iso-butanol distillate and substantially pure normal butanol as residue.

The impurities present in the crude iso-butanol consist in the main of esters. The iso-butanol may be saponified for the removal of the acid components, including formic acid, and the isobutanol thereafter redistilled.

The residual material after recovery of the required alcohols from the hydrogenated high boiling product usually contains a mixture of oxygenated organic compounds. This residue may be further fractionated for the recovery of $C_8$ alcohols as a distillate fraction. As with the isobutanol distillate, esters form the main impurities in this material, which may be purified by saponification and redistillation. The residue left after this distillation may, if desired, be saponified and fractionated under reduced pressure to yield $C_8$ glycols as a further product.

Although the Oxo synthesis reaction may be carried out in the presence of any of the cobalt catalysts known in the art for this purpose, the preferred process is operated in the presence of a cobalt carbonyl or cobalt hydrocarbonyl catalyst, prepared outside the reaction zone, the zone being operated without the introduction before or during the reaction of cobalt metal or solid cobalt compounds. This preferred process and other preferred process conditions, including methods of product operation and catalyst recovery, are described in the specifications filed in respect of co-pending United States applications Serial Nos. 78,226, 151,828, 184,684, 139,936, 206,324, all now abandoned, and 205,298.

The process of the invention is illustrated but in no way limited with reference to the figure accompanying this specification which is a diagrammatic flow sheet of a process suitable for use in connection with an Oxo synthesis using a propylene feedstock.

A mixture of carbon monoxide and hydrogen (for example water gas) is passed by the line 1 to the catalyst generating zone 2. This consists of one or more vessels packed with reduced cobalt oxide, through which the gas feed is passed. The gas stream from 2 containing volatile cobalt compounds produced in 2 then passes to the Oxo synthesis reaction stage 3, when it is joined by the olefin feed stream passing through line 4. The olefin is converted to aldehydes containing one more carbon atom/molecule in 3, the total effluent passing from the reactor by line 5 through the cooler 6 to the phase separator 7. Here gaseous effluents are removed by the line 8. The liquid product from 7 after reduction of pressure in one or more stages (not shown in figure) with removal of gas released at each stage, is passed at a pressure of 100–500 lbs./sq. in. to the carbonyl decomposition zone 9, where cobalt carbonyl is decomposed at a temperature in the range 150–250° C. and the resulting solid cobalt separated from the liquid products. The substantially cobalt free products then pass to the fractionator 10, in which unreacted olefin is removed as distillate and may, if desired, be recycled to the reactor 3. The olefin-free product then passes to the fractionator 12 by the line 11. In 12 the primary aldehyde product is removed as distillate. The fractionator 12 may be operated at atmospheric pressure for separating $C_3$, $C_4$ and $C_5$ aldehydes but with higher aldehydes it is preferred to operate this fractionator at reduced pressure. The aldehyde distillate is cooled in 13 and passed to storage. When using propylene as the Oxo olefinic feedstock, isobutyraldehyde and normal butyraldehyde is formed in the synthesis and in this case isobutyraldehyde is separated as distillate in 12, the normal aldehyde being distilled from the higher boiling by-products in the fractionator 14 and cooled in 15, passing thence to storage.

When forming higher aldehydes or where separation of individual aldehydes is not necessary, the second fractionation will not be required. The high boiling residue from 14 is fed through line 16 to the hydrogenation zone 17, where it is joined by hydrogen through line 18. The hydrogenated products are cooled in 19 and passed to the separator 20, where effluent hydrogen is separated. The liquid product is withdrawn by line 21 and passed to the fractionator 22, in which alcohols having the same number of carbon atoms/molecule as the primary aldehyde product are removed as distillate by the line 23, cooled in 25 and passed to storage. The residue from 22 is removed by line 24. The fractionator 22 may be operated at atmospheric pressure when separating propanol, butanols or amyl alcohols, but with higher alcohols is preferably run under reduced pressure. The residue removed by line 24 may, if desired, be further treated by saponification and fractionation of the separated oil layer to yield a further quantity of alcohols.

The invention is further illustrated but in no way limited by the following examples. The examples relate to the processing of a high boiling product obtained in the conversion of propylene to butyraldehydes by the Oxo synthesis reaction using separately prepared di-cobalt octacarbonyl as catalyst, the reaction pressure being 3000 lbs./sq. in. and the temperature 300° F. The product after separating gaseous material at 200 lbs./sq. in. pressure was fractionated to separate $C_3$ hydrocarbons, isobutyraldehyde and normal butyraldehyde, leaving a residue of higher boiling by-products. These higher boiling products formed the feedstock to the experiments described.

EXAMPLE 1

A number of high boiling products, from the operation of the Oxo synthesis stage for the conversion of propylene to butyraldehydes and in which the reaction efficiency for butyraldehyde production varied between 75 and 95 percent, were hydrogenated in a batch autoclave using Raney nickel as catalyst, at a temperature of 160° C. and a pressure of 100 atmospheres. The hydrogenated products were separated from catalysts by filtration and fractionated in a batch column equivalent to 10 theoretical plates. The yields of butanols obtained are shown in the following Table 1.

*Table 1*

| Oxo Synthesis Run No | 1 | 2 | 3 | 4 |
|---|---|---|---|---|
| Oxo reaction efficiency for butyraldehyde production | 95 | 75 | 80–82 | 80 |
| Wt. percent butanols in hydrogenated high boiling product | 38 | 18 | 34 | 52 |

EXAMPLE 2

This example illustrates the improvement in yield to be obtained by employing a high hydrogenation temperature. Raney nickel was again used as hydrogenation catalyst and the pressure was 100 atmospheres. The high boiling material processed was all derived from the same Oxo synthesis run, the reaction efficiency for butyraldehyde production being 80 percent by weight. The butanol yields obtained are shown in Table 2.

*Table 2*

| Hydrogenation Temp., °C | 130 | 190 |
|---|---|---|
| Yield of butanols, as wt. percent of high boiling product treated | 24 | 30 |

The butanol fraction obtained with a hydrogenation temperature of 190° C. was purer than with a hydrogenation temperature of 130° C. In both tests the ratio of iso-butanol to n-butanol formed was about 1:3. On re-fractionating the butanol product in a 25 plate batch column, normal butanol of satisfactory purity was obtained, most of the impurities in the butanol product distilling with the isobutanol.

EXAMPLE 3

This example illustrates the further processing of the product after removing the butanols. The residue remaining after removing the butanols from the product of run 1 of Table 1 was fractionated in a 100 plate column at a pressure of 100 mm. of mercury, to give the main fractions shown in Table 3.

*Table 3*

| Fraction No. | Wt. percent of butanol free hydrogenated product | Boiling Range, °C./100 mm. | Components of fraction |
|---|---|---|---|
| 1 | 13.5 | up to 120° C | Mixed esters and alcohols. |
| 2 | 31.3 | 120–150° C | $C_8$ alcohols. |
| 3 | 23.7 | 150–160° C | Mixed esters and higher alcohols. |
| Residue | 31.5 | 160° C | Not identified. |

The main alcohol present in Fraction 2 was identified as 2-ethylhexanol.

EXAMPLE 4

This example illustrates conditions for the recovery of normal- and iso-butanols. The butanol recovered from the product of run 1 of Table 1 was refractionated without prior treatment and an iso-butanol fraction equal to 30 percent by weight of the total butanols obtained containing about 65 percent by weight of isobutanol. On saponifying the product prior to fractionation an isobutanol fraction equal to 35 percent by weight of the total butanols and containing 85 percent by weight of isobutanol was obtained. The normal butanol fractions had an analytical purity of 99 percent by weight in each case.

We claim:

1. A process for the production of alcohols which comprises hydrogenating a distillation fraction which has been obtained as a high boiling residue from the production by the conversion of olefins to oxygen containing organic compounds by the Oxo synthesis reaction of a product, mainly aldehydic in character and containing at least one aldehyde containing $n+1$ carbon atoms, said fraction being substantially free of alcohol containing $n+1$ carbon atoms, and boiling above the boiling range of the main aldehydic product whereby said fraction is converted to yield alcohols having the same number of carbon atoms per molecule as the main aldehydic product.

2. A process as specified in claim 1 in which the hydrogenation is carried out in the presence of a nickel catalyst.

3. A process as specified in claim 1 in which the hydrogenation is carried out at a temperature in the range 150–200° C.

4. A process as specified in claim 1 in which the olefin is propylene.

5. A process as specified in claim 4 in which the product of hydrogenation is distilled with recovery of a fraction comprising alcohols having 4 carbon atoms/molecule and a fraction comprising alcohols having 8 carbon atoms/molecule.

6. A process for the production of alcohols which comprises reacting an olefinic hydrocarbon containing $n$ carbon atoms wherein $n$ is an integer with carbon monoxide and hydrogen in the presence of a cobalt catalyst and under the conditions of the Oxo synthesis reaction, distilling at least a part of the reaction product for the separation and recovery of an aldehyde fraction comprising at least one aldehyde containing $n+1$ carbon atoms and which is the main aldehydic product of said reaction, recovering the high boiling fraction remaining as a residue and which is substantially free of alcohol containing $n+1$ carbon atoms, and hydrogenating same for the production of alcohols having the same number of carbon atoms/molecule as said aldehydic products.

7. A process as specified in claim 6, in which the olefinic hydrocarbon has at least 3 carbon atoms/molecule and in which the product of the Oxo synthesis reaction is subjected to phase separation with removal of a gaseous effluent, the liquid phase being thereafter distilled for the separation of a hydrocarbon fraction, an aldehydic fraction and a high boiling fraction.

8. A process for the production of alcohols which comprises reacting an olefinic hydrocarbon containing $n$ carbon atoms wherein $n$ is an integer with carbon monoxide and hydrogen in the presence of a cobalt catalyst and under the conditions of the Oxo synthesis reaction, distilling at least part of the reaction product for the separation and recovery of an aldehydic fraction comprising at least one aldehyde containing $n+1$ carbon atoms and which is the main aldehydic product of said reaction, recovering a high boiling fraction which remains as a residue and which is substantially free of alcohol containing $n+1$ carbon atoms, separately hydrogenating said aldehydic fraction and said high boiling fraction whereby from said aldehydic fraction and said high boiling fraction there is formed alcohols having the same number of carbon atoms/molecule as said aldehydic product, blending the hydrogenation products and distilling the blended products with recovery of a fraction comprising alcohols having the same number of carbon atoms/molecule as said aldehydic product of the Oxo synthesis reaction.

References Cited in the file of this patent

UNITED STATES PATENTS

| Number | Name | Date |
|---|---|---|
| 2,504,682 | Harlan | Apr. 18, 1950 |
| 2,594,341 | Owen et al. | Apr. 29, 1952 |
| 2,595,096 | Parker | Apr. 29, 1952 |
| 2,609,397 | Gresham et al. | Sept. 2, 1952 |

FOREIGN PATENTS

| Number | Country | Date |
|---|---|---|
| 668,963 | Great Britain | Mar. 26, 1952 |